United States Patent
Zadie

(10) Patent No.: US 10,051,931 B2
(45) Date of Patent: Aug. 21, 2018

(54) UMBRELLA APPARATUS

(71) Applicant: Christopher Zadie, Las Vegas, NV (US)

(72) Inventor: Christopher Zadie, Las Vegas, NV (US)

( * ) Notice: Subject to any disclaimer, the term of this patent is extended or adjusted under 35 U.S.C. 154(b) by 0 days.

(21) Appl. No.: 15/675,752

(22) Filed: Aug. 13, 2017

(65) Prior Publication Data

US 2018/0049523 A1 Feb. 22, 2018

Related U.S. Application Data

(60) Provisional application No. 62/375,823, filed on Aug. 16, 2016.

(51) Int. Cl.
*A45B 23/00* (2006.01)
*A45B 25/00* (2006.01)
*A45B 3/00* (2006.01)
*F24J 2/52* (2006.01)
*E04H 12/22* (2006.01)
*H01M 10/46* (2006.01)

(52) U.S. Cl.
CPC ............ *A45B 25/00* (2013.01); *A45B 3/00* (2013.01); *E04H 12/22* (2013.01); *F24J 2/52* (2013.01); *H01M 10/465* (2013.01); *A45B 2023/0006* (2013.01); *A45B 2200/1027* (2013.01); *A45B 2200/1045* (2013.01)

(58) Field of Classification Search
CPC .... A45B 2200/1009; A45B 2200/1045; A45B 2200/1054; A45B 2200/1027
See application file for complete search history.

(56) References Cited

U.S. PATENT DOCUMENTS

| | | | | |
|---|---|---|---|---|
| 5,979,793 A * | 11/1999 | Louis | ...... | A45B 3/00 135/16 |
| 6,298,866 B1 * | 10/2001 | Molnar, IV | ...... | A45B 3/00 108/50.12 |
| 6,682,000 B1 * | 1/2004 | Apple | ...... | A45B 3/00 239/16 |
| 6,886,759 B1 * | 5/2005 | Okronick | ...... | A45B 3/00 239/16 |
| 7,104,270 B2 * | 9/2006 | Dong | ...... | A45B 3/00 135/16 |
| 7,537,015 B1 * | 5/2009 | Molnar, IV | ...... | A45B 23/00 108/50.12 |
| 9,750,318 B2 * | 9/2017 | Rao | ...... | A45B 25/18 |
| 2004/0228118 A1 * | 11/2004 | Peterson | ...... | A45B 3/04 362/102 |
| 2005/0161067 A1 * | 7/2005 | Hollins | ...... | A45B 23/00 135/16 |

(Continued)

FOREIGN PATENT DOCUMENTS

FR 2863151 A1 * 6/2005 ............... A45B 3/00

*Primary Examiner* — Robert Canfield
(74) *Attorney, Agent, or Firm* — RG Patent Consulting, LLC; Rachel Gilboy

(57) ABSTRACT

An improved umbrella apparatus is a portable umbrella with a support column having a container for holding a removable water tank with a pump for pumping misting water to misters that are attached to the perimeter edges of the umbrella. Solar panels are attached to the topside of the umbrella for charging rechargeable batteries to power the pump mechanism. The apparatus is useful for shade and cooling at the beach or at a sports game.

11 Claims, 3 Drawing Sheets

(56) References Cited

U.S. PATENT DOCUMENTS

| | | | |
|---|---|---|---|
| 2005/0172987 A1* | 8/2005 | Byrnes | A45B 3/00 135/33.5 |
| 2008/0048051 A1* | 2/2008 | Chang | A45B 3/00 239/289 |
| 2015/0216273 A1* | 8/2015 | Akin | A45B 25/00 135/16 |
| 2015/0366305 A1* | 12/2015 | Edwards | A45B 25/00 135/16 |

* cited by examiner

UMBRELLA APPARATUS

CROSS-REFERENCE TO RELATED APPLICATION

The present application is related to and claims priority from prior provisional application Ser. No. 62/375,823, filed Aug. 16, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of umbrellas and parasols, and more specifically relates to an improved umbrella apparatus.

2. Description of the Related Art

An umbrella or parasol is a folding canopy supported by wooden or metal ribs, which is usually mounted on a wooden, metal, or plastic pole. It is designed to protect a person against rain or sunlight. The word "umbrella" typically refers to a device used for protection from rain. The word parasol usually refers to an item designed to protect from the sun. Often the difference is the material used for the canopy; some parasols are not waterproof. Umbrella canopies may be made of fabric or flexible plastic. Umbrellas and parasols are primarily hand-held portable devices sized for personal use. The largest hand-portable umbrellas are golf umbrellas, and the most common large, non-portable, umbrellas usually utilize a heavy base for holding the umbrella or parasol vertical, such as those used with patio tables.

Umbrellas and parasols are often used interchangeably because the fabrics used most often today is a nylon which is suitable for use against both rain and sun. Large umbrellas used for patio tables are not practical to be used portably, and small personal umbrellas, while being portable, are too small to practicably be used by more than one person as a parasol. Midsized umbrellas or parasols are much more practical for portable use and provide shade for more than one person. Even in hot, sunny areas such as the beach, the use of umbrellas or parasols does not provide much of a cooling effect. They just block the sun. An improvement in umbrellas and parasols is needed.

Ideally, an umbrella or parasol should provide cooling in addition to blocking the sun, and yet, would operate reliably and be manufactured at a modest expense. Thus, a need exists for a reliable improved umbrella apparatus to avoid the above-mentioned problems.

BRIEF SUMMARY OF THE INVENTION

In view of the foregoing disadvantages inherent in the known umbrella and parasol art, the present invention provides a novel improved umbrella apparatus. The general purpose of the present invention, which will be described subsequently in greater detail, is to provide cooling in addition to blocking the sun.

An improved umbrella apparatus may comprise an umbrella assembly including a hollow base portion adapted to be placed upon a support surface, a hollow column attached to the hollow base portion that extends upwardly therefrom, a plurality of hollow ribs movably attached to the hollow column at proximal ends thereof that are adapted to be held in extended positions radially outward from the hollow column, a plurality of misting nozzle members connected to distal end portions of the plurality of hollow ribs, a canopy formed from a flexible material that is attached to the distal end portions of the plurality of hollow ribs to thereby form a canopy cover, and a plurality of solar panel members.

The plurality of solar panel members are attached to an upper surface of the canopy. A water supply system having a water tank member is located within the hollow base portion and is adapted to pump water from the water tank member toward the canopy cover. A water hose member extends from the water tank member to the water pump, then extends from the water pump to the plurality of hollow ribs and their respective misting nozzle members to thereby provide water from the water tank member to and through the plurality of hollow ribs and their respective misting nozzle members.

The improved umbrella apparatus may have a power system having a rechargeable battery member located within the hollow base portion that is electrically connected to and provides electric power to the water pump. The plurality of solar panel members are electrically connected to the rechargeable battery member to provide electrical power for recharging. The improved umbrella apparatus is adapted to provide shade and misting water to an area below and adjacent the canopy cover.

The hollow base portion includes a plurality of wheels adapted to allow movement of the improved umbrella apparatus from one location to another. The water pump is formed as a low flow, high pressure water pump. The water tank member is removable from the hollow base portion such that the water tank member can be refilled with water and replaced back into the hollow base portion. The rechargeable battery member is preferably formed as a direct current battery member.

The plurality of hollow ribs is equally spaced radially around the canopy cover. The plurality of solar panel members are formed from a flexible material. The water hose member is formed from a flexible material and the canopy is formed from a material chosen from a list of materials consisting of cotton, plastic, and nylon. The water hose member is formed from a material chosen from a list of materials consisting of, plastic, nylon, and stainless steel. The umbrella assembly further includes a plurality of stretcher members pivotally connected between the hollow column and each respective the plurality of hollow ribs, to thereby allow the canopy to extended between a stretched, in-use position and a folded, stored configuration.

The hollow base portion, the hollow column, and the plurality of hollow ribs are formed from a material chosen from a list of materials consisting of, plastic, ceramic, and stainless steel and the hollow base portion is formed having a rectangular cross section. The hollow base portion includes four wheels thereon with each of the four wheels respectively connected to a corner portion of the rectangular cross section. The hollow base portion includes a door member adapted to be opened and closed to allow the water tank member to be removed, refilled with water, and then replaced back into the hollow base portion.

The present invention holds significant improvements and serves as an improved umbrella apparatus. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved umbrella apparatus constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to umbrellas and parasols and more particularly to an improved umbrella apparatus as used to improve the cooling effect in addition to blocking the sun.

Generally speaking, an improved umbrella apparatus is a portable umbrella with a support column having a container for holding a removable water tank with a pump for pumping misting water to misters that are attached to the perimeter edges of the umbrella. Solar panels are attached to the topside of the umbrella for charging rechargeable batteries to power the pump mechanism. The apparatus is useful for shade and cooling at the beach or at a sports game.

Figure 1:
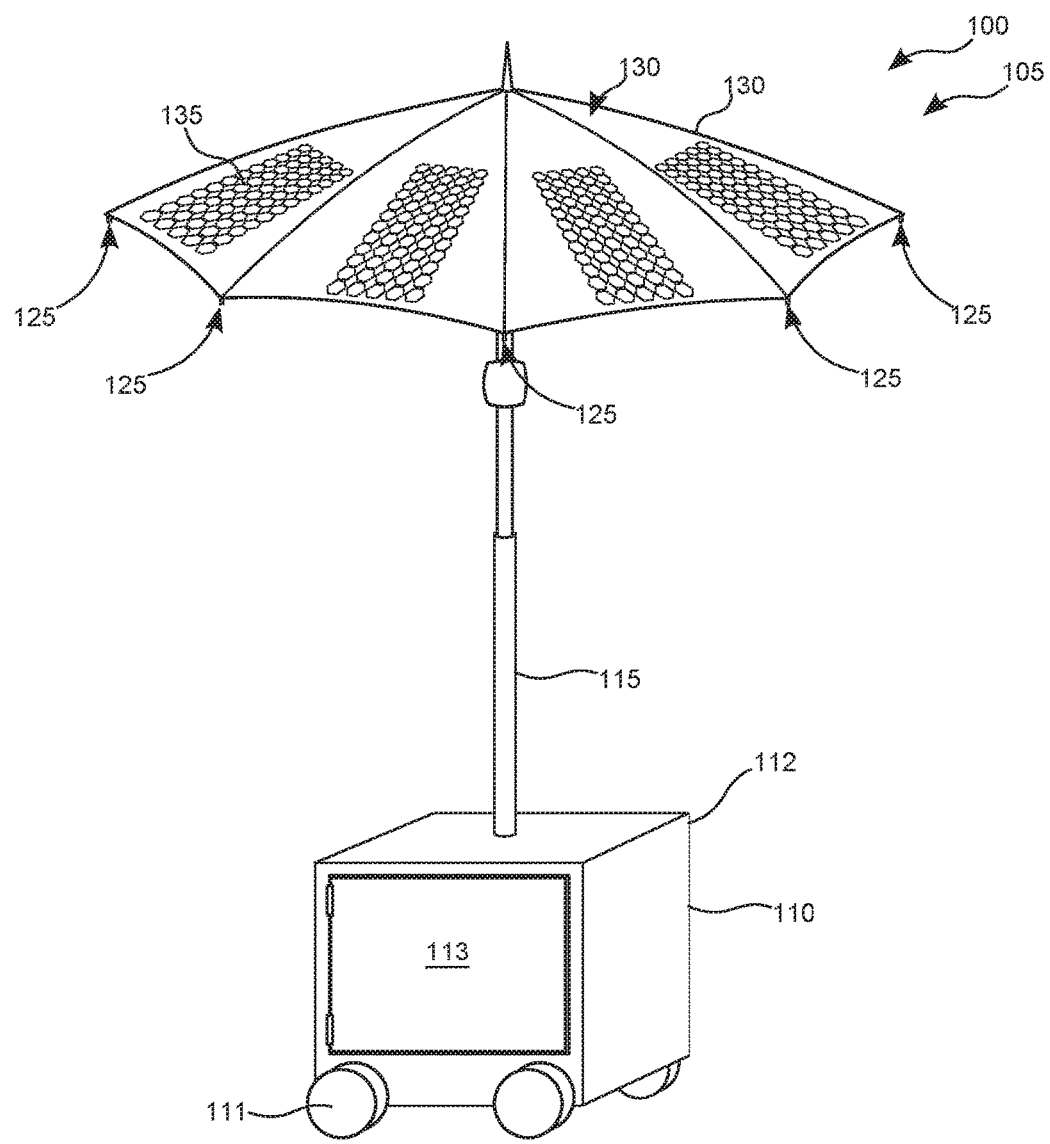
FIG. 1 shows a perspective view illustrating an improved umbrella apparatus according to an embodiment of the present invention.

Referring to the drawings by numerals of reference there is shown in FIG. 1, shows a perspective view illustrating improved umbrella apparatus 100 according to an embodiment of the present invention.

Improved umbrella apparatus 100 may comprise umbrella assembly 105 including hollow base portion 110 adapted to be placed upon a support surface, hollow column 115 attached to hollow base portion 110 that extends upwardly therefrom, a plurality of hollow ribs 120 movably attached to hollow column 115 at proximal ends 121 thereof that are adapted to be held in extended positions radially outward from hollow column 115, a plurality of misting nozzle members 125 connected to distal end portions 122 of the plurality of hollow ribs 120, canopy 130 formed from a flexible material that is attached to distal end portions 122 of the plurality of hollow ribs 120 to thereby form canopy 130, and a plurality of solar panel members 135.

Figure 2:
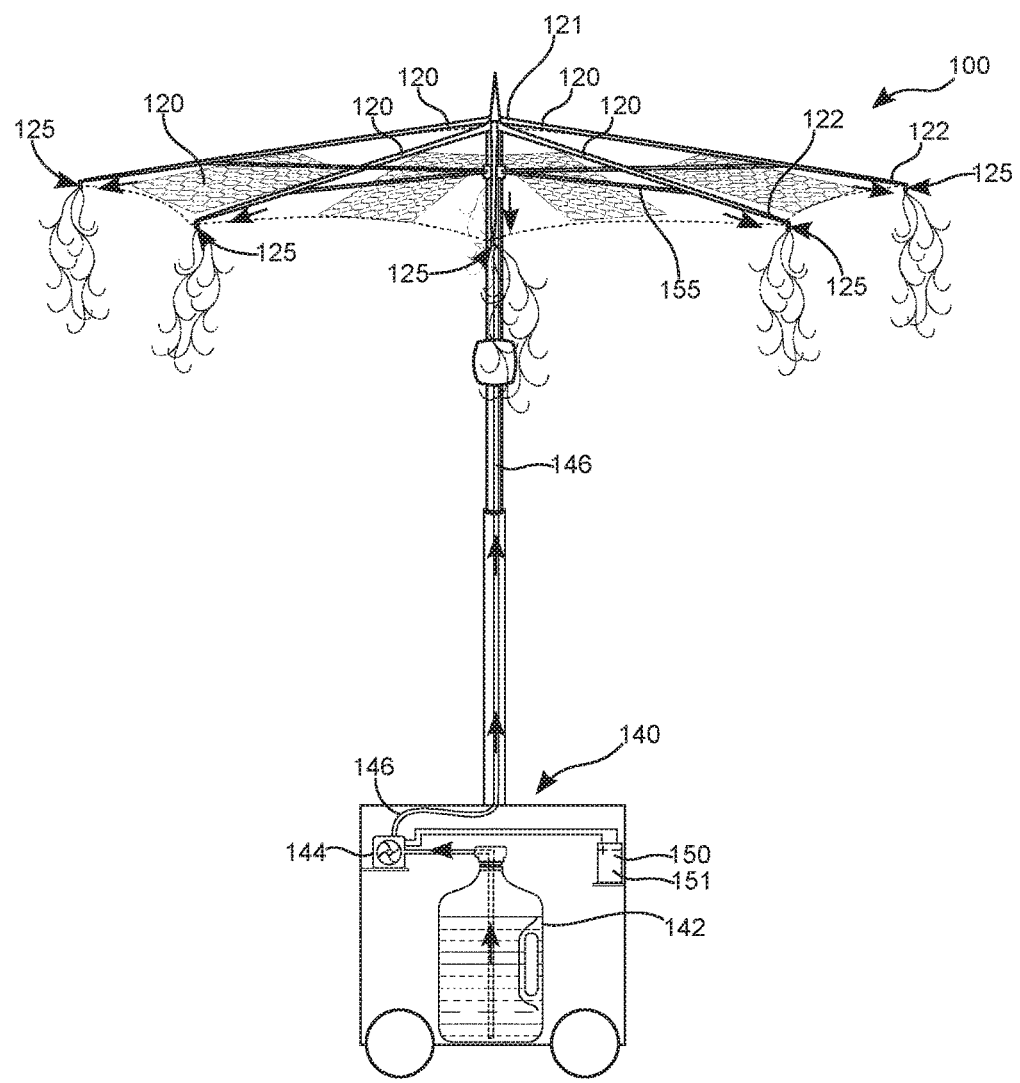
FIG. 2 is a side view illustrating a improved umbrella apparatus according to an embodiment of the present invention of FIG. 1.

Referring now to FIG. 2, is a side view illustrating improved umbrella apparatus 100 according to an embodiment of the present invention of FIG. 1.

The plurality of solar panel members 135 are attached to upper surface 131 of canopy 130. Water supply system 140 having water tank member 142 is located within hollow base portion 110 and is adapted to pump water from water tank member 142 toward canopy cover 130. Water hose member 146 extends from water tank member 142 to water pump 144, then extends from water pump 144 to the plurality of hollow ribs 120 and their respective misting nozzle members 125 to thereby provide water from water tank member 142 to and through the plurality of hollow ribs 120 and their respective misting nozzle members 125.

Improved umbrella apparatus 100 may have power system 150 having rechargeable battery member 151 located within hollow base portion 110 that is electrically connected to and provides electric power to water pump 144. The plurality of solar panel members 135 are electrically connected to rechargeable battery member 151 to provide electrical power for recharging. Improved umbrella apparatus 100 is adapted to provide shade and misting water to an area below and adjacent canopy cover 130.

Hollow base portion 110 includes a plurality of wheels 111 adapted to allow movement of improved umbrella apparatus 100 from one location to another. Water pump 144 is formed as a low flow, high pressure water pump 144. Water tank member 142 is removable from hollow base portion 110 such that water tank member 142 can be refilled with water and replaced back into hollow base portion 110. Rechargeable battery member 151 is preferably formed as a direct current rechargeable battery member 151.

Figure 3:
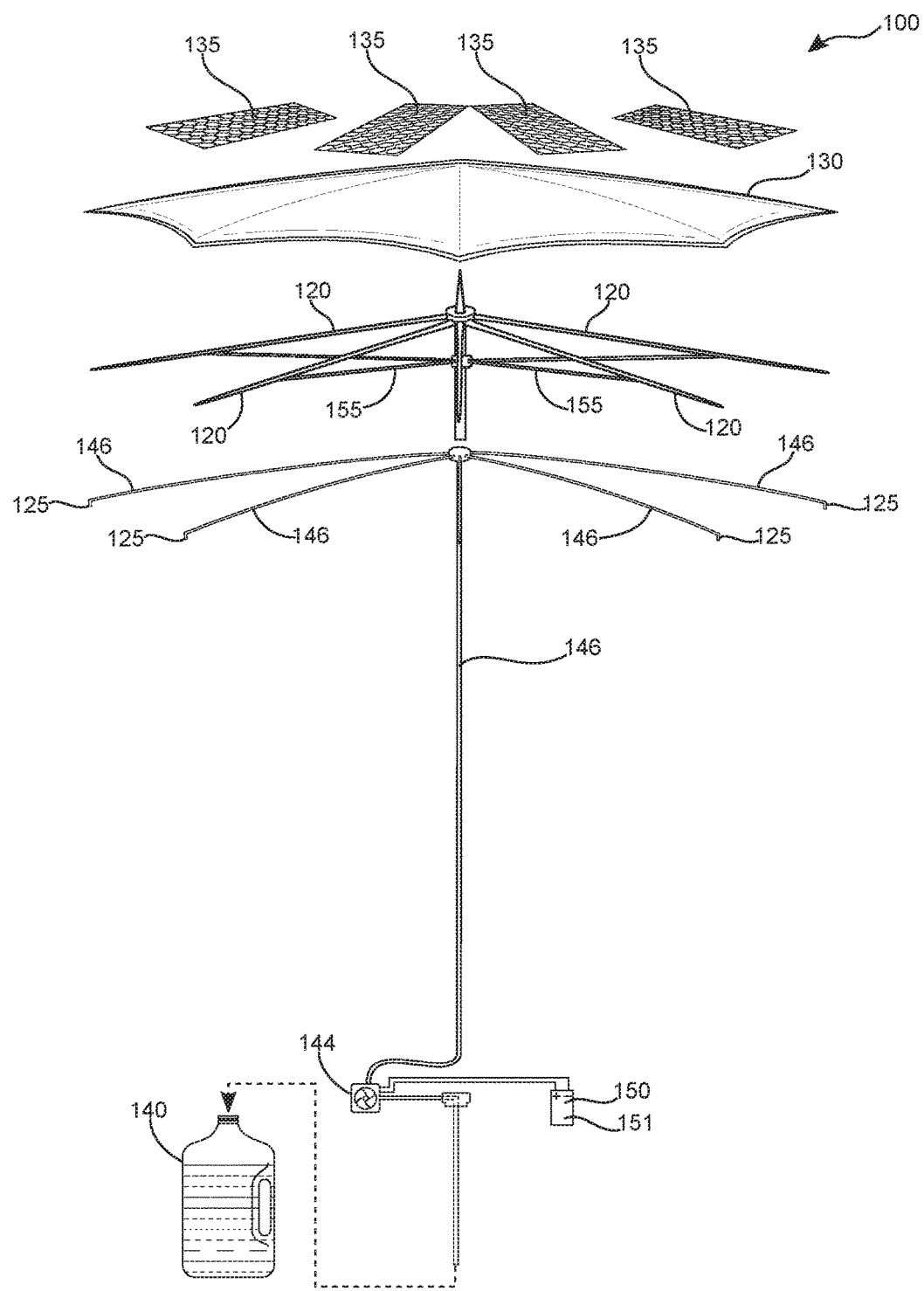
FIG. 3 is a disassembled view illustrating improved umbrella apparatus according to an embodiment of the present invention of FIG. 1.

Referring now to FIG. 3, is a disassembled view illustrating improved umbrella apparatus 100 according to an embodiment of the present invention of FIG. 1.

The plurality of hollow ribs 120 is equally spaced radially around canopy cover 130. The plurality of solar panel members 135 are formed from a flexible material. Water hose member 146 is formed from a flexible material and canopy cover 130 is formed from a material chosen from a list of materials consisting of cotton, plastic, and nylon. Water hose member 146 is formed from a material chosen from a list of materials consisting of, plastic, nylon, and stainless steel. Umbrella assembly 105 further includes a plurality of stretcher members 155 pivotally connected between hollow column 115 and each respective hollow rib(s) 120, to thereby allow canopy cover 130 to extend between a stretched, in-use position and a folded, stored configuration.

Hollow base portion 110, hollow column 115, and the plurality of hollow rib(s) 120 are formed from a material chosen from a list of materials consisting of, plastic, ceramic, and stainless steel and hollow base portion 110 is formed having a rectangular cross section. Hollow base portion 110 includes four wheels 111 thereon with each of the four wheels 111 respectively connected to corner portion 112 of the rectangular cross section. Hollow base portion 110 includes door member 113 adapted to be opened and closed to allow water tank member 142 to be removed, refilled with water, and then replaced back into hollow base portion 110.

Improved umbrella apparatus 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. An improved umbrella apparatus comprising:
    an umbrella assembly including:
        a hollow base portion;
            wherein said hollow base portion is adapted to be placed upon a support surface;
        a hollow column;
            wherein said hollow column is attached to said hollow base portion and extends upwardly therefrom;
        a plurality of hollow ribs;
            wherein said plurality of hollow ribs are movably attached to said hollow column at proximal ends thereof, and are adapted to be held in extended positions radially outward from said hollow column;
        a plurality of misting nozzle members;
            wherein said plurality of misting nozzle members are respectively connected to distal end portions of said plurality of hollow ribs;
        a canopy;
            wherein said canopy is attached to said distal end portions of said plurality of hollow ribs to thereby form a canopy cover; and
        a plurality of solar panel members;
            wherein said plurality of solar panel members are attached to an upper surface of said canopy;
    a water supply system comprising:
        a water tank member;
            wherein said water tank member is located within said hollow base portion and is adapted to hold water therein;
        a water pump;
            wherein said water pump is located within said hollow base portion and is adapted to pump water from said water tank member toward said canopy cover;
        a water hose member;
            wherein said water hose member extends from said water tank member to said water pump, then extends from said water pump to said plurality of hollow ribs and their respective misting nozzle members, to thereby provide water from said water tank member to and through said plurality of hollow ribs and their respective misting nozzle members; and
    a power system comprising;
        a rechargeable battery member;
            wherein said rechargeable battery member is located within said hollow base portion and is electrically connected to and provides electric power to said water pump; and
            wherein said plurality of solar panel members are electrically connected to said rechargeable battery member to provide electrical power thereto for recharging;
    wherein said improved umbrella apparatus is adapted to provide shade and misting water to an area below and adjacent said canopy cover;
    wherein said water tank member is removable from said hollow base portion, such that said water tank member can be refilled with water and replaced back into said hollow base portion.

2. The improved umbrella apparatus of claim 1, wherein said hollow base portion includes a plurality of wheels thereon adapted to allow movement of said improved umbrella apparatus from one location to another.

3. The improved umbrella apparatus of claim 2, wherein said hollow base portion is formed having a rectangular cross section.

4. The improved umbrella apparatus of claim 3, wherein said hollow base portion includes four said wheels thereon; wherein each of said four wheels are respectively connected to a corner portion of said rectangular cross section.

5. The improved umbrella apparatus of claim 1, wherein said rechargeable battery member is formed as a direct current battery member.

6. The improved umbrella apparatus of claim 1, wherein said plurality of hollow ribs are equally spaced radially around said canopy cover.

7. The improved umbrella apparatus of claim 1, wherein said canopy is formed from a material chosen from a list of materials consisting of cotton, plastic, and nylon.

8. The improved umbrella apparatus of claim 1, wherein said water hose member is formed from a material chosen from a list of materials consisting of, plastic, nylon, and stainless steel.

9. The improved umbrella apparatus of claim 1, wherein said umbrella assembly further includes a plurality of stretcher members pivotally connect between said hollow column and each respective said plurality of hollow ribs, to thereby allow said canopy to extended between a stretched, in-use position and a folded, stored configuration.

10. The improved umbrella apparatus of claim 1, wherein said hollow base portion, said hollow column, and said plurality of hollow ribs are formed from a material chosen from a list of materials consisting of, plastic, ceramic, and stainless steel.

11. The improved umbrella apparatus of claim 1, wherein said hollow base portion includes a door member adapted to be opened and closed to allow said water tank member to be removed, refilled with water, and then replaced back into said hollow base portion.

\* \* \* \* \*